US010018944B2

(12) United States Patent
Ueno et al.

(10) Patent No.: US 10,018,944 B2
(45) Date of Patent: Jul. 10, 2018

(54) DRIVE TRANSMISSION MECHANISM AND IMAGE FORMING APPARATUS THEREWITH

(71) Applicant: KYOCERA Document Solutions Inc., Osaka (JP)

(72) Inventors: Daijiro Ueno, Osaka (JP); Kenichi Mukai, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 36 days.

(21) Appl. No.: 15/340,677

(22) Filed: Nov. 1, 2016

(65) Prior Publication Data
US 2017/0153580 A1    Jun. 1, 2017

(30) Foreign Application Priority Data
Nov. 26, 2015   (JP) .................... 2015-230215

(51) Int. Cl.
*F16H 55/00*       (2006.01)
*G03G 15/16*       (2006.01)
(Continued)

(52) U.S. Cl.
CPC .......... *G03G 15/1615* (2013.01); *F16D 1/02* (2013.01); *F16D 1/10* (2013.01); *F16H 55/17* (2013.01);
(Continued)

(58) Field of Classification Search
CPC ............. G03G 15/1615; G03G 15/757; G03G 21/1647; G03G 2/1857; F16D 1/02; F16D 1/10; F16D 2001/102; F16H 55/17
See application file for complete search history.

(56) References Cited

U.S. PATENT DOCUMENTS 9,488,935 B1 *  11/2016  Embry ............... G03G 15/1615
2005/0111882 A1   5/2005  Sudo et al. .................... 399/222
(Continued)

FOREIGN PATENT DOCUMENTS

JP      2000-227690 A    8/2000
JP      2005-114159 A    4/2005

OTHER PUBLICATIONS

Extended European search report dated Apr. 7, 2017, issued by the European Patent Office in corresponding application EU 16198415.8.

*Primary Examiner* — Zakaria Elahmadi
(74) *Attorney, Agent, or Firm* — Stein IP, LLC

(57) ABSTRACT

A drive transmission mechanism includes a drive transmission gear, an output-side coupling, and a first drive transmission member. The drive transmission gear includes a cylindrical boss formed at the rotation center, a circular rim concentric with the boss, and a web coupling the boss with the rim. The output-side coupling outputs a driving force of the drive transmission gear to a driven member. The first drive transmission member has higher rigidity than the drive transmission gear, and transmits the driving force of the drive transmission gear to the output-side coupling by rotating together with the drive transmission gear. The output-side coupling incline in an arbitrary direction relative to the rotation axis of the first drive transmission member, and the driving force from the drive transmission gear is transmitted to the outer circumferential rim of the first drive transmission member.

9 Claims, 7 Drawing Sheets

(51) Int. Cl.
*F16D 1/02* (2006.01)
*F16D 1/10* (2006.01)
*F16H 55/17* (2006.01)
*G03G 15/00* (2006.01)
*G03G 21/16* (2006.01)
*G03G 21/18* (2006.01)

(52) U.S. Cl.
CPC ....... *G03G 15/757* (2013.01); *G03G 21/1647* (2013.01); *G03G 21/1857* (2013.01); *F16D 2001/102* (2013.01)

(56) References Cited

U.S. PATENT DOCUMENTS

| | | | |
|---|---|---|---|
| 2007/0119280 A1* | 5/2007 | Takahashi | F16D 7/044 81/152 |
| 2009/0169259 A1* | 7/2009 | Ebara | G03G 15/0935 399/167 |
| 2010/0041485 A1* | 2/2010 | Carter | F16D 1/0858 464/180 |
| 2010/0077880 A1* | 4/2010 | Mizuno | F16H 57/12 74/409 |
| 2015/0098728 A1* | 4/2015 | Hayakawa | G03G 15/757 399/167 |
| 2015/0160608 A1* | 6/2015 | Sawashima | G03G 21/186 399/167 |
| 2017/0090402 A1* | 3/2017 | Tamura | F16D 41/22 |

\* cited by examiner

DRIVE TRANSMISSION MECHANISM AND IMAGE FORMING APPARATUS THEREWITH

INCORPORATION BY REFERENCE

This application is based upon and claims the benefit of priority from the corresponding Japanese Patent Application No. 2015-230215 filed on Nov. 26, 2015, the entire contents of which are incorporated herein by reference.

BACKGROUND

The present disclosure relates to a drive transmission mechanism that transmits a driving force to a rotated member incorporated in an image forming apparatus such as a digital copier or a laser printer, and to an image forming apparatus incorporating such a drive transmission mechanism.

Commonly, in conventional drive transmission mechanisms used in driving portions in image forming apparatuses exploiting electrophotography, such as copiers, printers, and facsimile machines, rotary members such as photosensitive drums and developing rollers are typically used as driven members. To transmit a rotation driving force to such rotary members, there is known a drive transmission mechanism composed of a drive transmission gear for transmitting the rotation driving force of a driving portion, and a coupling (shaft coupling) coupling a rotary member (driven member)-side rotary shaft with a driving portion-side rotary shaft.

When a driving force is transmitted to a driven member by use of a driving portion composed of such a drive transmission gear and a coupling, axis misalignment may occur between their axes of rotation. Commonly, in one conventional configuration, both the drive transmission gear and the coupling are inclined with respect to the axis of rotation to perform axis alignment, or the coupling alone is inclined with respect to the drive transmission gear to perform axis alignment.

However, when a driving force is transmitted to a driven member such as a photosensitive drum which requires rotation with high accuracy, the driving portion needs to be rigid. In that case, with conventional axis alignment as described above, the drive transmission mechanism has reduced rigidity. More particularly, when a resin gear having comparatively low rigidity is used as a drive transmission gear, a gear surface (rim) is more likely to incline (slant) due to deformation of a web surface. Also, when the drive transmission gear is a helical gear, a load is applied in the thrust direction of the gear, and thus as the load varies, the amount of deformation varies, and the rotation of the gear varies accordingly.

As a method for suppressing axis misalignment between axes of rotation in a drive transmission mechanism, for example, there is known an image forming apparatus incorporating a drive transmission mechanism using an Oldham coupling that absorbs eccentricity and axis angle misalignment during rotation.

There is also known an image forming apparatus in which a driven-side (developer carrying member-side) rotation engaging portion is fitted to a driving-side rotation engaging portion such that fine alignment is performed with the driven-side rotation engaging portion fixed. In this image forming apparatus, a rotation driving force used for surface movement of a developer carrying member is transmitted, and a shaft arranged in at least one end part of a transmission gear that meshes with the driven-side rotation engaging portion is engaged with an image forming apparatus main body-side positioning portion, thereby to achieve positioning of a developer carrying member inside the main body of the image forming apparatus.

SUMMARY

According to one aspect of the present disclosure, a drive transmission mechanism includes a drive transmission gear, an output-side coupling, and a first drive transmission member. The drive transmission gear includes a boss in the shape of a cylinder formed at the center of rotation, a rim formed in a circular shape concentric with the boss outward of the boss in the radial direction and having cogs formed on the outer circumferential surface thereof, and a web coupling the boss with the rim, and is coupled with a drive input-side gear. The output-side coupling outputs a driving force of the drive transmission gear to a driven member. The first drive transmission member is formed in the shape of a flat plate out of a material having higher rigidity than the drive transmission gear, and transmits the driving force of the drive transmission gear to the output-side coupling by rotating together with the drive transmission gear about the same axis of rotation as the drive transmission gear. The output-side coupling incline in an arbitrary direction with respect to the axis of rotation of the first drive transmission member, and the driving force from the drive transmission gear is transmitted to the outer circumferential rim of the first drive transmission member.

Further features and advantages of the present disclosure will become apparent from the description of embodiments given below.

DETAILED DESCRIPTION

Figure 1:
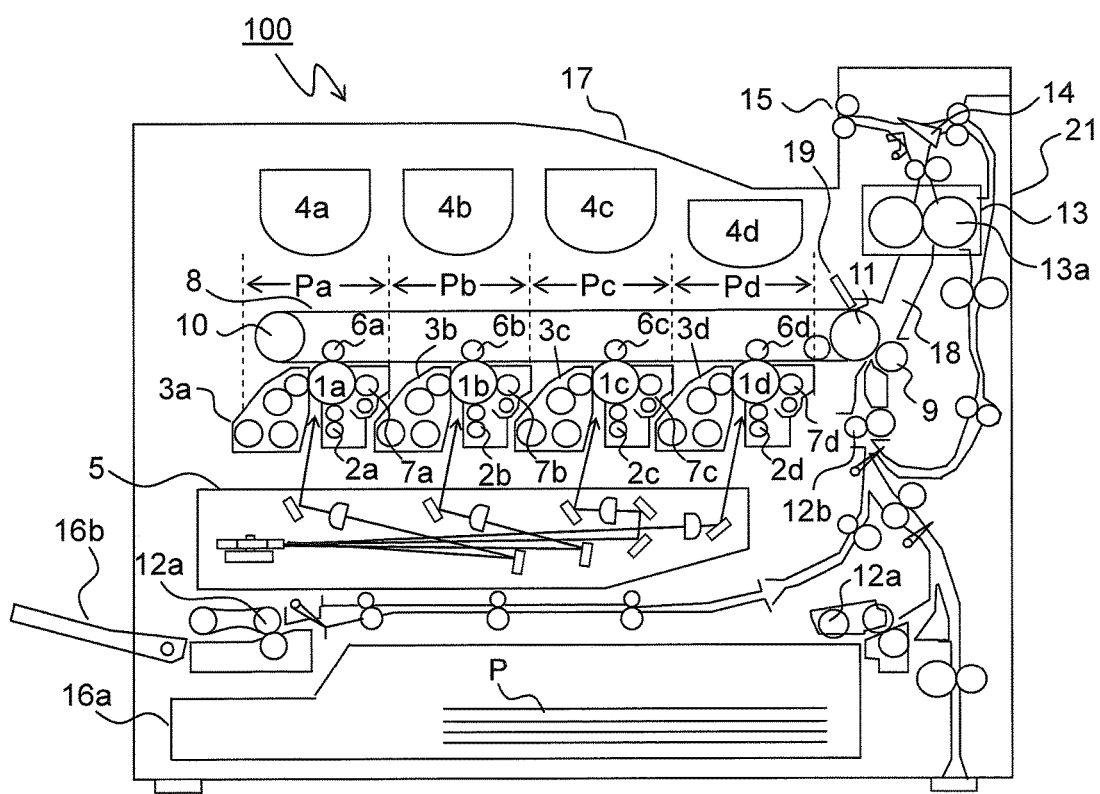
FIG. 1 is a diagram showing an outline of a construction of a color printer 100 incorporating a drive transmission unit 30 according to the present disclosure.

Hereinafter, embodiments of the present disclosure will be described with reference to the accompanying drawings. FIG. 1 is a schematic sectional view showing an internal structure of a color printer 100 incorporating a drive transmission unit 30 according to the present disclosure. The color printer 100 is of a tandem-type; inside the main body of the color printer 100, four image forming portions Pa, Pb, Pc, and Pd are arranged in this order from the upstream side with respect to the transport direction (the left side in FIG. 1) so as to correspond to images of four different colors (cyan, magenta, yellow, and black) respectively.

In these image forming portions Pa to Pd, there are respectively arranged photosensitive drums 1a, 1b, 1c and 1d that carry visible images (toner images) of the different colors. Moreover, an intermediate transfer belt 8 that rotates in the counter-clockwise direction in FIG. 1 by being driven by a driving means (unillustrated) is arranged next to the image forming portions Pa to Pd. An image forming process is performed with respect to each of the photosensitive drums 1a to 1d while these are rotated in the clockwise direction in FIG. 1.

Sheets P to which toner images are to be transferred are stored in a sheet feed cassette 16a in a lower part of the main body of the color printer 100, or are stacked on a manual sheet feed tray 16b arranged on a side surface of the main body of the color printer 100. A sheet P is transported via a feeding roller 12a and a registration roller pair 12b to a nip between a secondary transfer roller 9 and a driving roller 11 of the intermediate transfer belt 8, which will be described later. On the downstream side of the secondary transfer roller 9, a blade-shaped belt cleaner 19 is arranged for removing toner and the like remaining on the surface of the intermediate transfer belt 8.

Now, the image forming portions Pa to Pd will be described. Around and under the photosensitive drums 1a to 1d, which are rotatably arranged, there are arranged charging devices 2a, 2b, 2c, and 2d for electrostatically charging the photosensitive drums 1a to 1d, an exposure device 5 for exposing the photosensitive drums 1a to 1d to light based on image data, developing devices 3a, 3b, 3c, and 3d for forming toner images on the photosensitive drums 1a to 1d, and cleaning devices 7a, 7b, 7c, and 7d for removing developer (toner) and the like remaining on the photosensitive drums 1a to 1d.

When image data is fed in from a host device such as a personal computer, first, by the charging devices 2a to 2d, the surfaces of the photosensitive drums 1a to 1d are electrostatically charged uniformly. Then, by the exposure device 5, the surfaces of the photosensitive drums 1a to 1d are irradiated with light based on the image data, and thereby electrostatic latent images based on the image data are formed on the photosensitive drums 1a to 1d respectively. The developing devices 3a to 3d are charged with predetermined amounts of two-component developer containing toner of different colors, namely cyan, magenta, yellow, and black respectively. When the proportion of toner contained in the two-component developer stored in the developing devices 3a to 3d falls below a predetermined value through formation of toner images, which will be described later, toner is supplied from toner containers 4a to 4d to the developing devices 3a to 3d respectively. The toner contained in the developer is fed from the developing devices 3a to 3d onto the photosensitive drums 1a to 1d, and electrostatically attaches to them, thereby forming toner images based on the electrostatic latent images formed by exposure to light from the exposure device 5.

Then, by primary transfer rollers 6a to 6d, a predetermined transfer voltage is applied between the primary transfer rollers 6a to 6d and the photosensitive drums 1a to 1d, and the cyan, magenta, yellow, and black toner images on the photosensitive drums 1a to 1d are primarily transferred to the intermediate transfer belt 8. After the primary transfer, toner and the like remaining on the surfaces of the photosensitive drums 1a to 1d are removed by the cleaning devices 7a to 7d.

The intermediate transfer belt 8 is wound around a tension roller 10 on the upstream side and the driving roller 11 on the downstream side. As the driving roller 11 rotates by being driven by a driving motor (unillustrated), the intermediate transfer belt 8 rotates in the counter-clockwise direction; meanwhile, a sheet P is transported from the registration roller pair 12b, with predetermined timing, to a nip (secondary transfer nip) between the driving roller 11 and the secondary transfer roller 9, which is arranged next to the driving roller 11, so that a full-color image on the intermediate transfer belt 8 is transferred to the sheet P. The sheet P having the toner images transferred to it is transported through a sheet transport passage 18 to a fixing device 13.

The sheet P transported to the fixing device 13 is heated and pressed there by a fixing roller pair 13a so that the toner images are fixed to the surface of the sheet P to form a predetermined full-color image. The sheet P having the full-color image formed on it is distributed between different transport directions by a branching portion 14 which branches into a plurality of directions. When an image is formed only on one side of the sheet P, the sheet P is discharged, as it is, onto a discharge tray 17 by a discharge roller pair 15.

Figure 2:
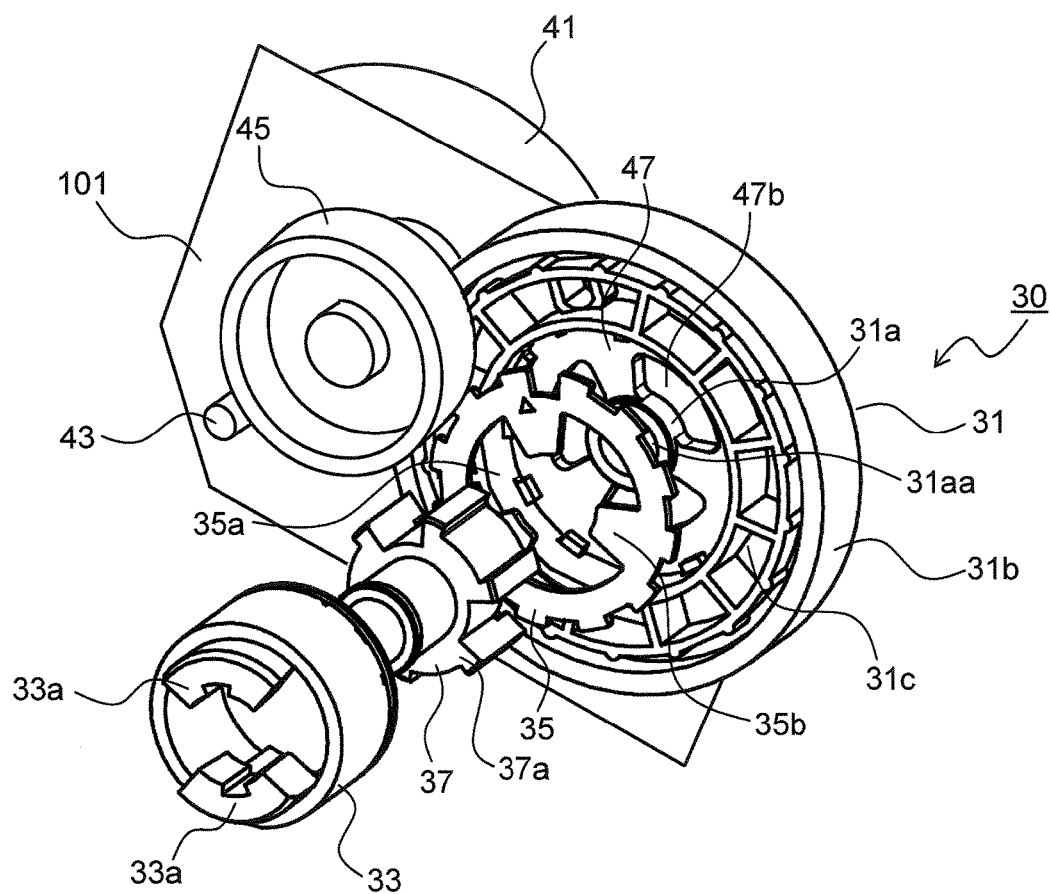
FIG. 2 is a perspective view showing a structure of and around a drive transmission unit 30 according to one embodiment of the present disclosure.
Figure 3:
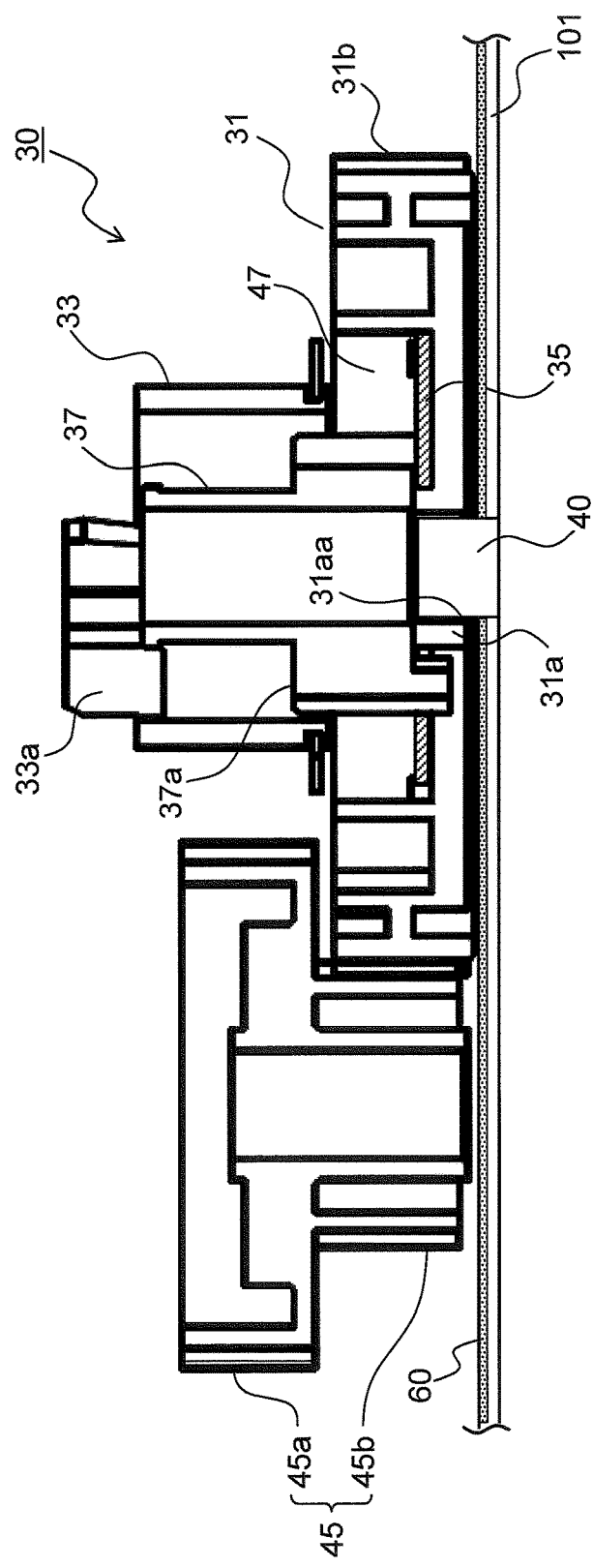
FIG. 3 is a side sectional view showing a structure of and around the drive transmission unit 30 according to the present embodiment.
Figure 4:
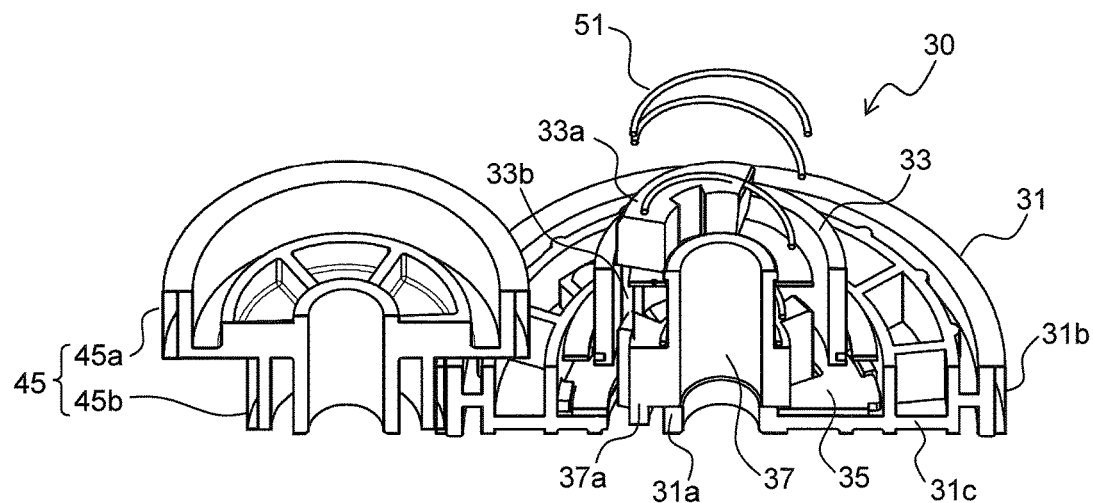
FIG. 4 is a sectional perspective view of the drive transmission unit 30.
Figure 5:
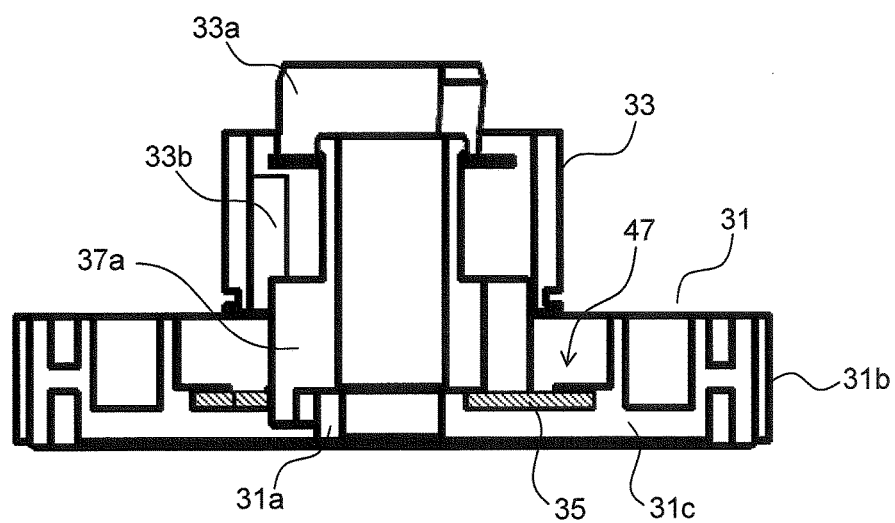
FIG. 5 is a side sectional view of the drive transmission unit 30.
Figure 6:
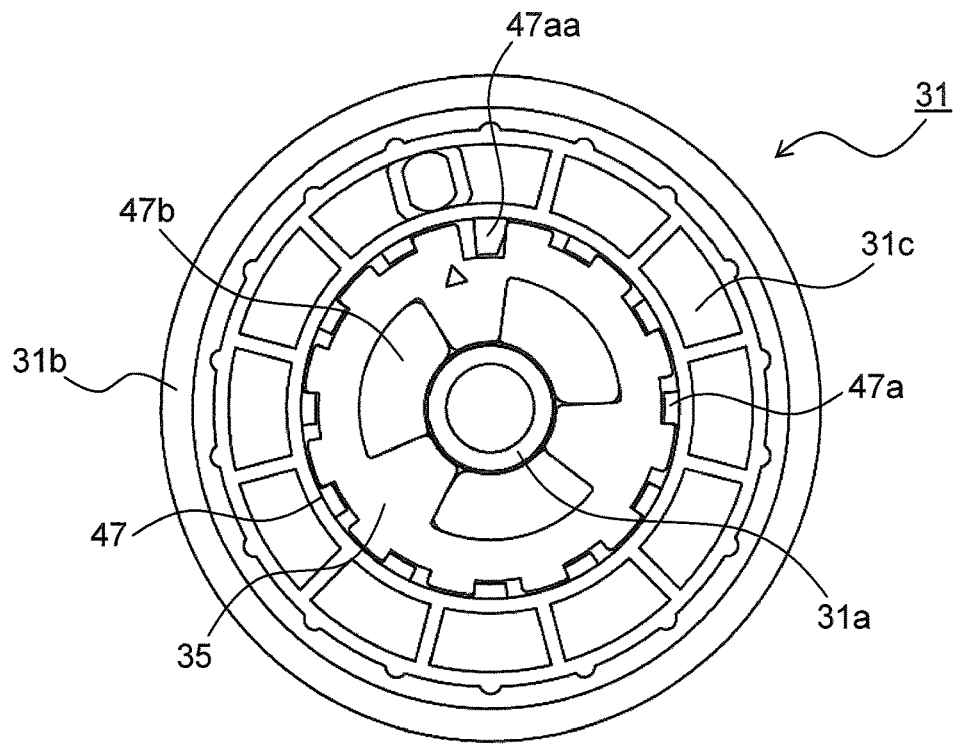
FIG. 6 is a plan view showing an engaged state of a large diameter gear 31 and a first drive transmission member 35 provided in the drive transmission unit 30.
Figure 7:
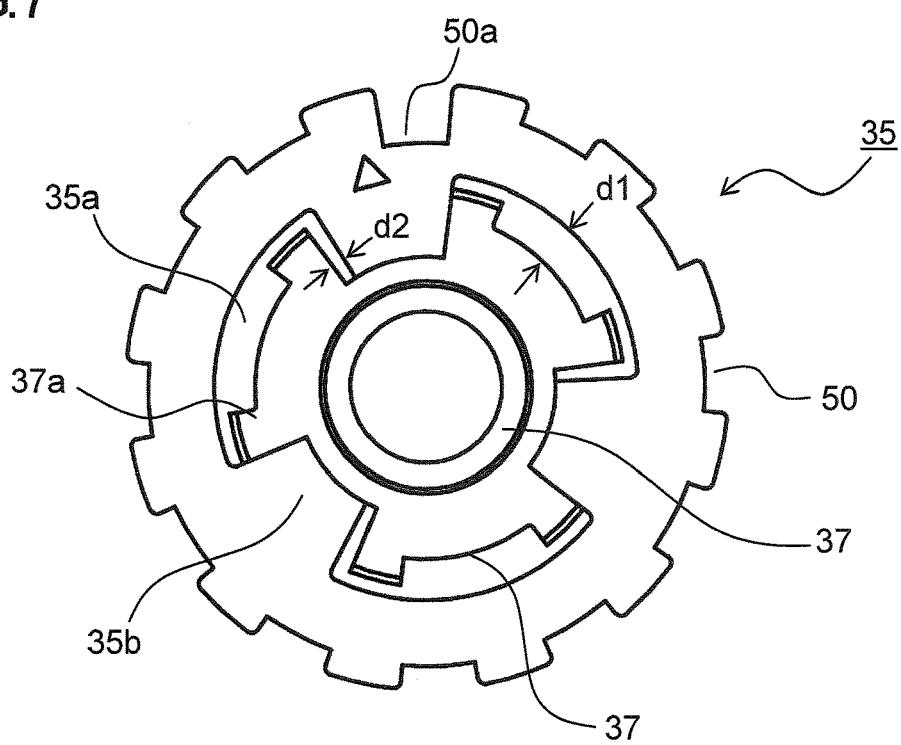
FIG. 7 is a plan view showing an engaged state of the first drive transmission member 35 and a second drive transmission member 37 provided in the drive transmission unit 30.
Figure 8:
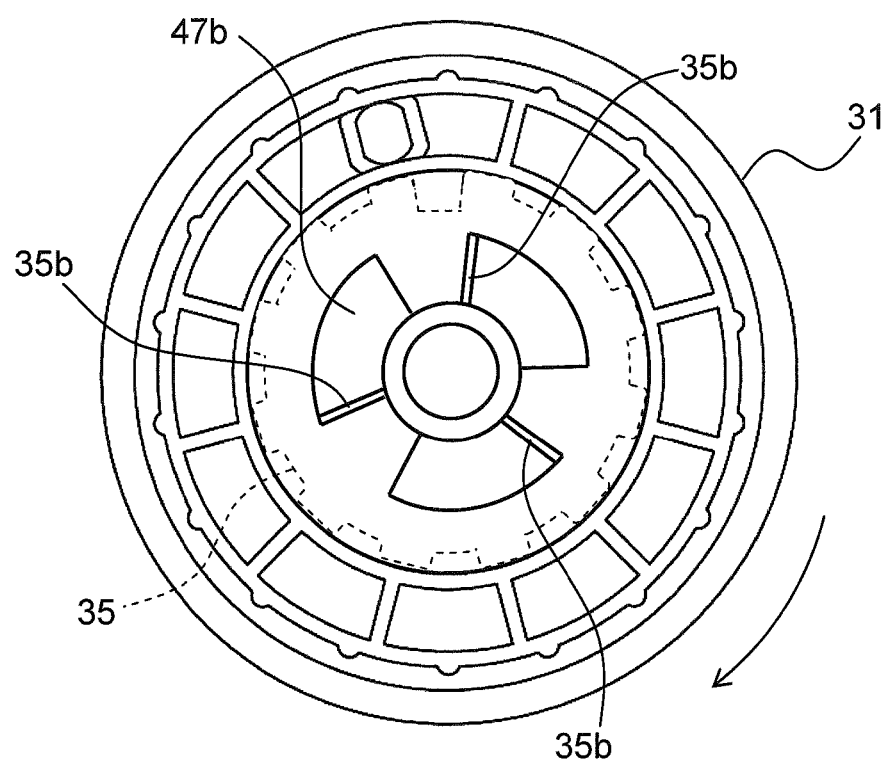
FIG. 8 is a plan view of the large diameter gear 31, as seen from the rear side, to which the first drive transmission member 35 is fitted.

FIGS. 2 and 3 are respectively a perspective view and a side sectional view showing a structure of and around the drive transmission unit 30, which transmits a driving force to the photosensitive drums 1a to 1d of the color printer 100, according to one embodiment of the present disclosure. FIGS. 4 and 5 are respectively a sectional perspective view and a side sectional view of the drive transmission unit 30. FIG. 6 is a plan view showing an engaged state of a large diameter gear 31 and a first drive transmission member 35 provided in the drive transmission unit 30. FIG. 7 is a plan view showing an engaged state of the first drive transmission member 35 and a second drive transmission member 37 provided in the drive transmission unit 30. FIG. 8 is a plan view of the large diameter gear 31, as seen from the rear side (from a side surface frame 101-side), to which the first drive transmission member 35 is fitted. FIG. 2 shows a disassembled state of the drive transmission unit 30. Next, the structure of the drive transmission unit 30 will be described with reference to FIGS. 2 to 8.

As shown in FIGS. 2 and 3, the drive transmission unit 30 includes a large diameter gear 31 rotatably supported on the inner side of the side surface frame 101 (on the front side with respect to the plane of FIG. 2) which is arranged on the inner side of the side surface of the color printer 100, an output-side coupling 33 fitted on an input-side coupling (unillustrated) fixed to one side of a rotary shaft of the photosensitive drums 1a to 1d (see FIG. 1), and first and second drive transmission members 35 and 37 for transmitting the rotation driving force of the large diameter gear 31 to the output-side coupling 33. The other side of the rotary shaft of the photosensitive drums 1a to 1d is rotatably supported on a color printer 100 main body-side bearing (unillustrated).

The large diameter gear 31 is formed, for example, by injection molding of resin such as POM (polyacetal). The large diameter gear 31 is composed of a boss 31a in the shape of a cylinder formed in a central part, a rim 31b formed in a circular shape concentric with the boss 31a outward of the boss 31a in the radial direction, and a web 31c which couples the boss 31a with the rim 31b.

At the center of the boss 31a, there is formed a through hole 31aa in which a rotation shaft 40, which is fixed to the side surface frame 101, is inserted. The large diameter gear 31 is rotatably supported on the rotation shaft 40. On the outer circumferential surface of the rim 31b, there are formed cogs (unillustrated) that mesh with a small diameter portion 45b of a two-stage gear 45. The large diameter gear 31 is a "helical gear" in which the cogs formed on the rim 31b run helically.

When the rotation shaft 40 is inserted in the through hole 31aa and the large diameter gear 31 is fitted to the side surface frame 101, as shown in FIG. 3, the bottom edge of the rim 31b is, over the entire circumference, in contact with the side surface frame 101, and the boss 31a is arranged at a predetermined interval from the side surface frame 101.

The output-side coupling 33 is formed in a cylindrical shape by sintering iron powder. At a tip end of the output-side coupling 33, there is formed a pair of engaging claws 33a that engages with the input-side coupling of the photosensitive drum 1a. On the inner circumferential surface of the output-side coupling 33, there is formed a protruding portion 33b (see FIGS. 4 and 5) that engages with an engaging portion 37a of the second drive transmission member 37 when the output-side coupling 33 is fitted around the second drive transmission member 37.

The first drive transmission member 35 is a disk-shaped member made of metal. The first drive transmission member 35 is held in a holding portion 47 which is a circular depression formed in a circular shape concentric with the boss 31a in the web 31c of the large diameter gear 31, and rotates together with the large diameter gear 31 about the same axis of rotation as the large diameter gear 31. In the first drive transmission member 35, a first engaging hole 35a is formed in which the shaft 40 is inserted and with which the second transmission member 37 engages. On the inner circumferential rim of the first engaging hole 35a, there are formed engaging pieces 35b protruding respectively from a plurality of places (here three places) toward the center. On the outer circumferential rim of the first drive transmission member 35, a plurality of concavities 50 (see FIG. 7) are formed at equal intervals in the circumferential direction.

The second drive transmission member 37 is formed in a cylindrical shape by sintering iron powder. At three places on the outer circumferential surface of the second drive transmission member 37, the engaging portions 37a in the shape of a fan as seen from the axial direction are respectively formed at equal intervals in the circumferential direction. The output-side coupling 33 is fitted around an upper end part of the second drive transmission member 37, and the output-side coupling 33 and the second drive transmission member 37 rotate about the same axis of rotation.

As shown in FIG. 4, between the output-side coupling 33 and the second drive transmission member 37, a coil spring 51 is arranged. The coil spring 51 biases the output-side coupling 33 in a direction away from the second drive transmission member 37 (the upward direction in FIG. 4) along the axis of rotation. FIG. 4 illustrates only part of the coil spring 51.

When the photosensitive drums 1a to 1d are removed from the color printer 100, the photosensitive drums 1a to 1d are thrusted to move toward one side (the side surface frame 101-side) in the axial direction. Thus, against the biasing force of the coil spring 51, the output-side coupling 33 is pressed toward the second drive transmission member 37. As a result, the engagement of the other side of the rotary shaft of the photosensitive drums 1a to 1d with the color printer 100 main body-side bearing is released.

On the other hand, when the photosensitive drums 1a to 1d are mounted into the color printer 100, against the biasing force of the coil spring 51, the output-side coupling 33 is pressed toward the second drive transmission member 37. Then, with the input-side coupling, which is fixed to the rotary shaft of the photosensitive drums 1a to 1 d, engaged with the output-side coupling 33, the other side of the rotary shaft of the photosensitive drums 1a to 1d is engaged with the color printer 100 main body-side bearing. Then, when the pressure of the output-side coupling 33 is released, the biasing force of the coil spring 51 biases the output-side coupling 33 in the direction of the input-side coupling, with the result that the engaged state of the other side of the rotary shaft of the photosensitive drums 1a to 1 d with the color printer 100 main body-side bearing is held. As described above, the photosensitive drums 1a to 1d are mountable and dismountable in a direction orthogonal to the rotary shaft.

Back in FIG. 2, to the outer side of the side surface frame 101 (on the rear side with respect to the plane of FIG. 2), a driving motor 41 is fixed for driving the photosensitive drum 1a; to the motor rotation shaft of the driving motor 41, a pinion gear 43 is fixed. On the inner side of the side surface frame 101, the two-stage gear 45 is rotatably supported. Of the two-stage gear 45, the large diameter portion 45a engages with the pinion gear 43 and the small diameter portion 45b engages with the large diameter gear 31. The two-stage gear 45 is a "helical gear" in which the cogs formed on the large and small diameter portions 45a and 45b run helically.

Next, a description will be given of the path along which a driving force is transmitted by the drive transmission unit 30. As the driving motor 41 is driven to rotate, a driving force is transmitted to the large diameter portion 45a of the two-stage gear 45 via the pinion gear 43 fixed to the motor rotation shaft. Then, as the two-stage gear 45 rotates, the driving force is transmitted to the large diameter gear 31 engaged with the small diameter 45b.

As shown in FIG. 6, on the inner circumferential surface of the holding portion 47 of the large diameter gear 31, a plurality of convexities 47a are formed. Moreover, in the holding portion 47, second engaging holes 47b in the shape of a fan in plan view are formed at three places. The first drive transmission member 35 is held with the plurality of concavities 50, which are formed on the outer circumferential rim, engaged with the convexities 47a. With this configuration, the driving force of the large diameter gear 31 can be transmitted to the first drive transmission member 35 at the places where the convexities 47a and the concavities 50 engage with each other, that is, at the outer circumferential rim of the first drive transmission member 35.

As shown in FIG. 7, the second drive transmission member 37 is inserted in the first engaging hole 35a of the first drive transmission member 35, and the engaging portions 37a formed respectively at three places on the outer circumferential rim of the second drive transmission member 37 are engaged with the engaging pieces 35b. With this configuration, the driving force of the first drive transmission member 35 can be transmitted to the second drive transmission member 37 at the places where the engaging pieces 35b and the engaging portions 37a engage with each other.

When the first engaging hole 35a of the first drive transmission member 35 and the engaging portions 37a of the second drive transmission member 37 are in an engaged state, between the inner circumferential rim of the first engaging hole 35a and the engaging portions 37a, a predetermined gap d1 is formed in the radial direction. Between the engaging pieces 35b and the engaging portions 37a, a predetermined gap d2 is formed in the circumferential direction.

Then, when the engaging portion 37a is engaged with the protruding portion 33b, the driving force is transmitted from the second drive transmission member 37 to the output-side coupling 33, and is transmitted via the input-side coupling, which is fitted in the output-side coupling 33, to the photosensitive drums 1a to 1d.

In a conventional configuration in which the output-side coupling 33 is directly engaged with the boss 31a of the large diameter gear 31 to transmit a driving force to the output-side coupling 33, the distance is large between a drive input portion (the outer circumferential surface of the rim 31b) from the two-stage gear 45 to the large diameter gear 31 and a drive output portion (the boss 31a) from the large diameter gear 31 to the output-side coupling 33; this causes the web 31c to deform easily.

On the other hand, in the above-described configuration according to the present embodiment, a driving force is transmitted from the large diameter gear 31 (convexities 47a) to the outer circumferential rim (concavities 50) of the first drive transmission member 35, and thus the distance is small between a drive input portion (the outer circumferential surface of the rim 31b) from the two-stage gear 45 to the large diameter gear 31 and a drive output portion (the outer circumferential rim of the first drive transmission member 35) from the large diameter gear 31 to the first drive transmission member 35. As a result, the web 31c is less likely to collapse (deform). Thus, it is possible to suppress deformation of the web 31c resulting from a load applied in the thrust direction from the two-stage gear 45.

Both of the first drive transmission member 35 made of metal and the second drive transmission member 37 formed by sintering iron powder have high rigidity, and thus it is possible to reliably transmit a driving force from the first drive transmission member 35 to the second drive transmission member 37.

Here, the first and second drive transmission members 35 and 37 are engaged with each other with the predetermined gaps d1 and d2 in the radial and circumferential directions respectively; this permits the second drive transmission member 37 to freely incline in an arbitrary direction with respect to the first drive transmission member 35 (large diameter gear 31). Thus, even when axis misalignment occurs between the center of rotation of the large diameter gear 31 and the center of rotation of the output-side coupling 33, owing to the second drive transmission member 37 inclining with respect to the first drive transmission member 35, it is possible to correct the axis misalignment between the large diameter gear 31 to which the first drive transmission member 35 is fixed and the output-side coupling 33 to which the second drive transmission member 37 is fixed.

In the large diameter gear 31, the bottom edge of the rim 31b is in contact with the side surface frame 101 over the entire circumference, and the boss 31a is arranged at a predetermined interval from the side surface frame 101. Thus, it is possible to suppress inclination of the large diameter gear 31 with respect to the side surface frame 101 resulting from a load working from the two-stage gear 45 on the large diameter gear 31 in the thrust direction. Here, to reduce the friction between the side surface frame 101 and the large diameter gear 31, a film 60 (see FIG. 3) providing higher slidability than the side surface frame 101, such as a polyethylene terephthalate (PET) film, is preferably bonded to the surface of the side surface frame 101.

As shown in FIG. 6, one of the plurality of convexities 47a is a positioning convexity 47aa whose shape differs from the others. As shown in FIG. 7, one of the plurality of concavities 50 formed on the first drive transmission member 35 is a positioning concavity 50a which engages with the positioning convexity 47aa. When the first drive transmission member 35 is fitted to the large diameter gear 31, it is fitted such that the positioning convexity 47aa and the positioning concavity 50a engage with each other, and thereby the positions (phase) of the first engaging hole 35a in the first drive transmission member 35 and the second engaging holes 47b in the large diameter gear 31 are determined in the circumferential direction.

Specifically, as shown in FIG. 8, the phase is determined such that, when the large diameter gear 31 is seen from the rear side (from the side surface frame 101-side), a part of the engaging piece 35b protrudes to the upstream side of the second engaging hole 47b with respect to the rotation direction of the large diameter gear 31 (the clockwise direction in FIG. 8). Thus, when the large diameter gear 31 rotates, the engaging pieces 35b of the first drive transmission member 35 can be reliably put in contact with the engaging portions 37a of the second drive transmission member 37, and thus it is possible to suppress deformation of the web 31c of the large diameter gear 31.

Figure 9:
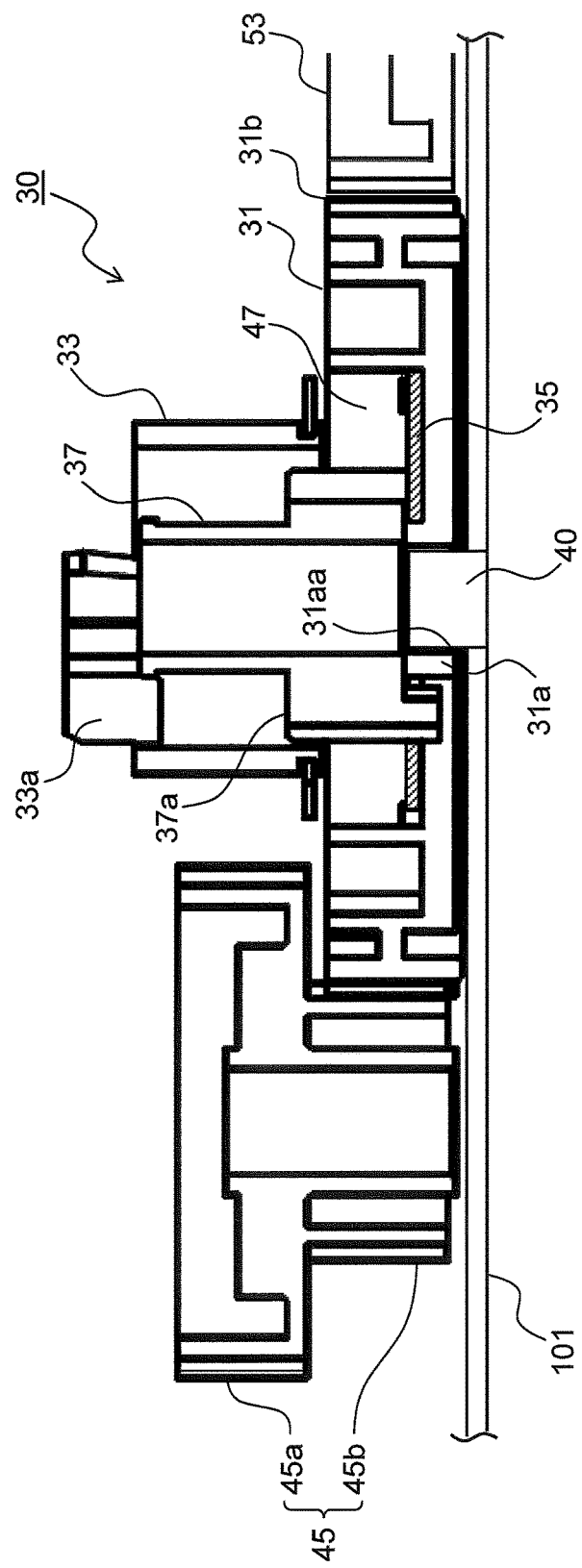
FIG. 9 is a side sectional view showing a state where an idle gear 53 is coupled with the large diameter gear 31 provided in the drive transmission unit 30 according to the present embodiment.

FIG. 9 is a side sectional view showing a state where an idle gear 53 is coupled with the large diameter gear 31 provided in the drive transmission unit 30. In the configuration shown in FIG. 9, the idle gear 53 meshes with the rim 31b of the large diameter gear 31, and thus a driving force can be transmitted from the large diameter gear 31 via the idle gear 53 to the other driven members.

In the drive transmission unit 30 according to the present embodiment, as described above, the web 31c is less likely to be deformed by a load working in the thrust direction from the two-stage gear 45. Thus, even when the rotational torque of the large diameter gear 31 varies, of the large diameter gear 31, the opposite part (part which meshes with the idle gear 53 on the right side in FIG. 9) from a part which meshes with the two-stage gear 45 does not swing up and down. This, as compared with the conventional configuration, helps improve the rotation accuracy of the idle gear 53 which meshes with the large diameter gear 31 at the side opposite from a part thereof with which the two-stage gear 45 meshes as shown in FIG. 9, and thus a driving force can be transmitted with high accuracy also to the other driven members.

The embodiments described above are in no way meant to limit the present disclosure, which thus allows for many modifications and variations within the spirit of the present disclosure. For example, although in the above-described embodiment, the first and second drive transmission members 35 and 37 are arranged between the large diameter gear 31 and the output-side coupling 33, the first drive transmission member 35 and the output-side coupling 33 may be directly connected to each other by use of the output-side coupling 33 formed integrally with the second drive transmission member 37. In that case, by providing the output-side coupling 33 with an engaging portion that engages with the first engaging hole 35a with predetermined margins in the radial and circumferential directions, it is possible to engage the output-side coupling 33 with the first drive transmission member 35 so that these can incline with respect to the axial direction of the rotary shaft.

The configuration of the drive transmission unit 30 shown in FIGS. 2 to 9 is merely one example; the shapes and the like of the large diameter gear 31, the output-side coupling 33, the first drive transmission member 35, and the second drive transmission member 37 can be chosen as necessary. For example, although in the above-described embodiment, the large diameter gear 31 and the two-stage gear 45 are "helical gears", they may instead be spur gears. It is also possible to use a first drive transmission member 35 in a polygonal shape in place of the first drive transmission member 35 in the shape of a disk.

The arrangement of the drive transmission unit 30 is also not limited to the above-described arrangement. For example, the drive transmission unit 30 may be arranged in a drive transmission path along which a driving force is transmitted to the developing devices 3a to 3d.

The present disclosure is applicable, not only to tandem-type color printers 100 like the one shown in FIG. 1, but also to various image forming apparatuses such as monochrome and digital multifunction peripherals, monochrome printers, and facsimile machines.

The present disclosure is applicable to a drive transmission mechanism that transmits a driving force to a rotated member by use of a drive transmission gear and a coupling. Based on the present disclosure, it is possible to provide a drive transmission mechanism that can suppress deformation of a web surface when a resin gear is used as a drive transmission gear and that can correct axis misalignment between the drive transmission gear and a coupling, and to provide an image forming apparatus provided with such a drive transmission mechanism.

What is claimed is:

1. A drive transmission mechanism comprising:
    a drive transmission gear including a boss in a shape of a cylinder formed at a center of rotation, a rim formed in a circular shape concentric with the boss outward of the boss in a radial direction and having cogs formed on an outer circumferential surface thereof, and a web coupling the boss with the rim, the drive transmission gear being coupled with a drive input-side gear;
    an output-side coupling for outputting a driving force of the drive transmission gear to a driven member; and
    a first drive transmission member which is a disk-shaped metal member rotating together with the drive transmission gear about a same axis of rotation as the drive transmission gear, the first drive transmission member transmitting the driving force of the drive transmission gear to the output-side coupling;
    a second drive transmission member formed of a material having higher rigidity than the drive transmission gear, the second drive transmission member transmitting a driving force of the first drive transmission member to the output-side coupling by rotating about a same axis of rotation as the output-side coupling; and
    a biasing member arranged between the second drive transmission member and the output-side coupling, the biasing member biasing the output-side coupling in a direction away from the second drive transmission member along the axis of rotation of the output-side coupling, wherein
    the output-side coupling inclines in an arbitrary direction with respect to the axis of rotation of the first drive transmission member,
    in the web of the drive transmission gear, a holding portion that holds the first drive transmission member is formed in a concave shape with a substantially same diameter as the first drive transmission member, and on an inner circumferential rim of the holding portion, a plurality of convexities are formed that engage with a plurality of concavities formed on the outer circumferential rim of the first drive transmission member,
    the driving force from the drive transmission gear is transmitted to an outer circumferential rim of the first drive transmission member as a result of the drive transmission gear rotating in a state where the concavities and the convexities are engaged with each other,
    in the first drive transmission member, a plurality of first engaging holes are formed at equal intervals in a circumferential direction, and
    on an outer circumferential surface of the second drive transmission member, a plurality of engaging portions that engage with the first engaging holes with predetermined margins in radial and circumferential directions are formed at equal intervals.

2. The drive transmission mechanism of claim 1, wherein in the first drive transmission member, a plurality of engaging pieces protruding from inner circumferential rims of the first engaging holes toward a center thereof are formed, and in the holding portion, second engaging holes are formed so as to overlap the first engaging holes, and
    when the first drive transmission member is held in the holding portion, the engaging pieces protrude to a downstream side of upstream-side edges of the second engaging holes with respect to a rotation direction of the drive transmission gear.

3. The drive transmission mechanism of claim 1, wherein one of the plurality of concavities and one of the plurality of convexities are respectively a positioning concavity and a positioning convexity for adjusting a phase of the drive transmission gear to a phase of the first drive transmission member.

4. The drive transmission mechanism of claim 1, wherein the drive transmission gear is rotatably supported on a rotation shaft fixed to a frame,
    a bottom edge of the rim is, over an entire circumference thereof, in contact with the frame, and
    the boss is arranged at a predetermined interval from the frame.

5. The drive transmission mechanism of claim 4, wherein to a surface of the frame in contact with the bottom edge of the rim, a film providing higher slidability than the frame is bonded.

6. The drive transmission mechanism of claim 1, wherein in the drive transmission gear, a drive output-side gear for transmitting a driving force to another driven member is coupled with a part of the outer circumferential surface of the rim opposite from a part thereof that is coupled with the drive input-side gear across the boss.

7. The drive transmission mechanism of claim 1, wherein the drive transmission gear is a helical gear.

8. The drive transmission mechanism of claim 1, wherein the drive transmission gear is formed of a resin material.

9. An image forming apparatus comprising the drive transmission mechanism of claim 1.

* * * * *